(No Model.)
J. D. POTTER.
HEATING DEVICE.
No. 275,409.　　　　　　　　Patented Apr. 10, 1883.
Fig. 1.　　　　　　　　Fig. 2.
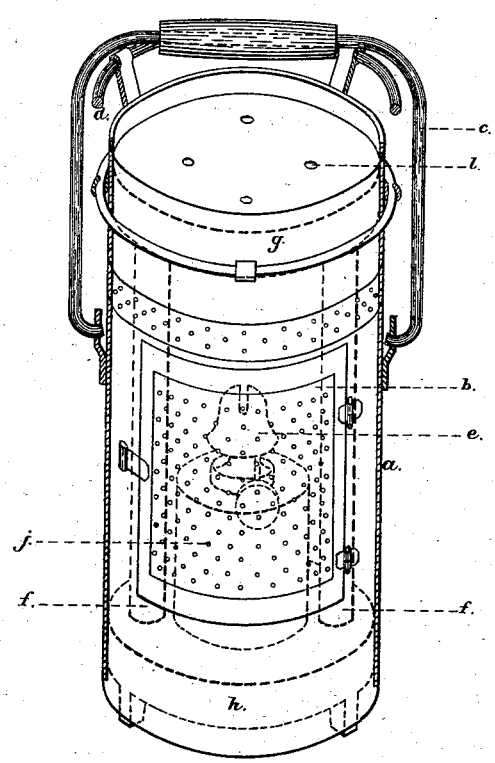
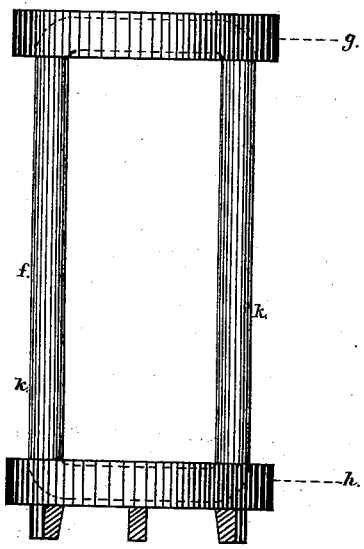
Fig. 3.　　　　　　　　Fig. 4.
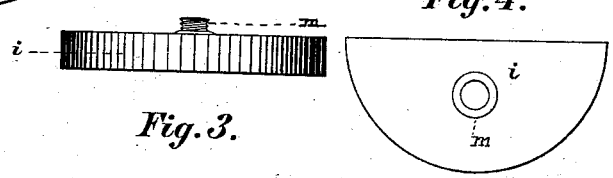
Witnesses:　　　　　　　　Inventor.

UNITED STATES PATENT OFFICE.

JAMES D. POTTER, OF PORTLAND, MAINE.

HEATING DEVICE.

SPECIFICATION forming part of Letters Patent No. 275,409, dated April 10, 1883.

Application filed February 21, 1883. (No model.)

*To all whom it may concern:*

Be it known that I, JAMES D. POTTER, of Portland, in the county of Cumberland and State of Maine, have invented certain new and useful Improvements in Heating Devices; and I do hereby declare that the following is a full, clear, and exact description of the invention, which will enable others skilled in the art to which it appertains to make and use the same, reference being had to the accompanying drawings, and to letters of reference marked thereon, which form a part of this specification.

Figure 1 is a side view in perspective. Fig. 2 is a side view of the interior frame with the heating surfaces or plates. Fig. 3 is an edge view of one of the cups. Fig. 4. is a plan of same.

Same letters show like parts.

My invention relates to portable warming devices.

It consists in the combination of an outer perforated case, $a$, having a door, $b$, bail or handle $c$, and guard $d$, with a lamp, $e$, and an interior frame, $f$, heating plates or surfaces $g$ $h$, one being perforated, and two semicircular removable closed cups, $i$ $i$, as herein set forth.

$a$ is the case, made of sheet metal, cylindrical in form, and having perforations $j$. It is provided with the door $b$. Within is the lamp $e$, resting on the heating plate or surface $h$. This heating plate or surface is solid, and carries the two rods $k$ $k$, which rise to the heating-surface $g$. As shown in Fig. 2, the rods are curved and extend through the metal of the two plates or surfaces. The upper plate or surface, $g$, is perforated at $l$ to allow the heat of the lamp to pass readily through to the two cups $i$ $i$, (semicircular in form,) which rest on the top of the surface or plate $g$. These cups $i$ $i$ may contain water to be heated and then used for warmers for the hands, or to contain drink, which can be warmed by the same means.

$e$ is the lamp to heat up the device. Heat is communicated from the plate or surface $g$, through the rods $k$ $k$, to the lower plate, $h$. The two plates or surfaces $g$ $h$ are made of thick iron, so that when heated they will radiate a considerable amount of heat.

$c$ shows the bail or handle by which the device is carried about.

$d$ is a guard to rest the feet upon, if desired, and to keep the device from contact with objects near to which it may be placed. The cups $i$ $i$ have screw tops and caps $m$.

The whole device is intended for a portable warmer in traveling in cold weather, and for any such similar uses as it can be put to. It can be used in sleighs, coaches, &c., where heating apparatus cannot be placed. Small rooms can be somewhat tempered by it, even when made so small as to be easily carried about.

What I claim as my invention, and desire to secure by Letters Patent of the United States, is—

The combination of the perforated case $a$, having door $b$, bail or handle $c$, and guard $d$, with the interior frame, $f$, composed of rods $k$ $k$ and plates or surfaces $g$ $h$, plate $g$ being perforated, and the semicircular cups $i$ $i$, as herein set forth.

In testimony that I claim the foregoing as my own I affix my signature in presence of two witnesses.

JAMES DODGE POTTER.

Witnesses:
 HERBERT M. SYLVESTER,
 JOHN P. KERRIGAN.